United States Patent
Boelke et al.

(10) Patent No.: US 10,913,545 B2
(45) Date of Patent: Feb. 9, 2021

(54) ARCHITECTURE FOR PROVIDING ENHANCED ALTITUDE FUNCTIONALITY TO AIRCRAFT AIR DATA SYSTEM

(71) Applicant: Rosemount Aerospace Inc., Burnsville, MN (US)

(72) Inventors: Joel Boelke, Eden Prairie, MN (US); Brian Brent Naslund, Chanhassen, MN (US); Benjamin John Langemo, Shakopee, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 16/009,911

(22) Filed: Jun. 15, 2018

(65) Prior Publication Data
US 2019/0389594 A1 Dec. 26, 2019

(51) Int. Cl.
*B64D 43/00* (2006.01)
*G01C 23/00* (2006.01)
*G01P 5/14* (2006.01)

(52) U.S. Cl.
CPC ............. *B64D 43/00* (2013.01); *G01C 23/00* (2013.01); *G01P 5/14* (2013.01)

(58) Field of Classification Search
CPC ........ B64D 43/00; B64D 45/00; G01C 23/00; G01C 5/06; G01C 5/005; G01P 5/14; G01P 5/165; G01P 13/025; G01P 21/025; G01S 19/17
See application file for complete search history.

(56) References Cited

U.S. PATENT DOCUMENTS

| | | | |
|---|---|---|---|
| 4,112,756 | A | 9/1978 | MacLennan et al. |
| 4,143,548 | A | 3/1979 | Graewe et al. |
| 4,303,978 | A | 12/1981 | Shaw et al. |

(Continued)

FOREIGN PATENT DOCUMENTS

| | | |
|---|---|---|
| DE | 102014105366 A1 | 10/2015 |
| EP | 1256811 A2 | 11/2002 |

(Continued)

OTHER PUBLICATIONS

Ardupilot, "Using an Airspeed Sensor," https://ardupilot.org/plane/docs/airspeed.html, [Jan. 16, 2018 Archive copy: https://web.archive.org/web/20180116072550/https://ardupilot.org/plane/docs/airspeed.html] (Year: 2018).*

(Continued)

*Primary Examiner* — Peter D Nolan
*Assistant Examiner* — Ashley L Redhead, Jr.
(74) *Attorney, Agent, or Firm* — Kinney & Lange, P.A.

(57) ABSTRACT

A system and method of augmenting an existing air data system includes a multi-function probe (MFP) having a portion extending into an oncoming airflow about an exterior of an aircraft. A plurality of pressure sensing ports in the portion includes at least first and second static pressure ports. A first electronics channel of the MFP includes pressure sensors communicating with the first and second static pressure ports and is configured to determine first and second altitude values based on sensed static pressures at the first and second static pressure ports, respectively, that are independent of the existing air data system.

8 Claims, 4 Drawing Sheets

(56) References Cited

U.S. PATENT DOCUMENTS

| | | | |
|---|---|---|---|
| 5,423,209 | A | 6/1995 | Nakaya et al. |
| 5,585,557 | A | 12/1996 | Loschke et al. |
| 6,012,331 | A | 1/2000 | Menzies et al. |
| 6,336,060 | B1 | 1/2002 | Shigemi et al. |
| 6,452,542 | B1 | 9/2002 | Bachinski et al. |
| 6,561,020 | B2 | 5/2003 | Glenney |
| 6,604,029 | B2 | 8/2003 | Cronin et al. |
| 6,609,421 | B2 | 8/2003 | Cronin et al. |
| 6,626,024 | B1 * | 9/2003 | Hedrick ............... G01C 5/005 73/1.78 |
| 6,668,640 | B1 | 12/2003 | Alwin et al. |
| 7,051,586 | B2 | 5/2006 | Choisnet et al. |
| 7,155,969 | B2 | 1/2007 | Drutowski et al. |
| 7,379,839 | B2 | 5/2008 | Cronin et al. |
| 8,095,251 | B2 * | 1/2012 | Preaux ............... G01P 13/025 701/7 |
| 8,261,609 | B2 | 9/2012 | Choisnet et al. |
| 8,365,591 | B2 | 2/2013 | Golly |
| 8,527,233 | B2 | 9/2013 | McIntyre |
| 9,121,860 | B1 | 9/2015 | Cronyn |
| 9,612,252 | B2 | 4/2017 | Waddington |
| 9,834,316 | B2 | 12/2017 | Rolinski et al. |
| 2002/0169525 | A1 | 11/2002 | Cronin et al. |
| 2004/0122615 | A1 | 6/2004 | Cronin et al. |
| 2007/0107510 | A1 * | 5/2007 | Agami ............... G01P 5/14 73/182 |
| 2007/0182590 | A1 | 8/2007 | Younkin |
| 2007/0220967 | A1 | 9/2007 | Thomas et al. |
| 2009/0055036 | A1 * | 2/2009 | Vozhdaev ............... G01P 1/02 701/14 |
| 2009/0222150 | A1 | 9/2009 | Preaux |
| 2011/0141471 | A1 | 6/2011 | Schlotterbeck et al. |
| 2012/0123704 | A1 | 5/2012 | Golly et al. |
| 2012/0298801 | A1 * | 11/2012 | Ellison ............... B64D 43/02 244/129.1 |
| 2014/0180503 | A1 | 6/2014 | Colliau et al. |
| 2015/0006020 | A1 | 1/2015 | D'Arbonneau |
| 2015/0012155 | A1 | 1/2015 | Mandle |
| 2015/0032300 | A1 | 1/2015 | Arethens et al. |
| 2015/0233962 | A1 | 8/2015 | Tchoryk et al. |
| 2015/0276787 | A1 | 10/2015 | Kimmel et al. |
| 2016/0180611 | A1 | 6/2016 | Cadotte et al. |
| 2016/0305802 | A1 * | 10/2016 | Chong ............... G01P 5/16 |
| 2017/0158347 | A1 | 6/2017 | Anderson et al. |

FOREIGN PATENT DOCUMENTS

| | | |
|---|---|---|
| EP | 1256812 A2 | 11/2002 |
| EP | 1256863 A2 | 11/2002 |
| EP | 1391736 A1 | 2/2004 |
| EP | 1936386 A2 | 6/2008 |
| EP | 2434296 A2 | 3/2012 |
| EP | 2453245 A1 | 5/2012 |
| EP | 2923949 A1 | 9/2015 |
| EP | 3081945 A1 | 10/2016 |
| IN | 201301950 | 6/2016 |
| WO | WO02088632 A2 | 11/2002 |
| WO | WO2006046271 A2 | 5/2006 |
| WO | WO2015179905 A1 | 12/2015 |

OTHER PUBLICATIONS

Extended European Search Report for EP Application No. 19175352.4, dated Nov. 12, 2019, pp. 8.

Extended European Search Report for EP Application No. 19179986.5, dated Nov. 12, 2019, pp. 9.

Extended European Search Report for EP Application No. 19180014.3, dated Nov. 22, 2019, pp. 9.

Extended European Search Report for European Patent Application No. 17206457.8, dated Feb. 22, 2018, 8 pages.

Extended European Search Report for European Patent Application No. 17207656.4, dated Mar. 2, 2018, 8 pages.

"Deutsche Airbus Flight Test of Rosemount Smart Probe for Districuted Air Data Systems" Floyd W. Hagen and Dr. Harald Seidel, pp. 110-117.

* cited by examiner

ARCHITECTURE FOR PROVIDING ENHANCED ALTITUDE FUNCTIONALITY TO AIRCRAFT AIR DATA SYSTEM

BACKGROUND

The present disclosure relates generally to air data systems and, more particularly, to air data systems on aircraft that desire to operate with Reduced Vertical Separation Minimum (RVSM) compliant altitude functionality.

Modern aircraft often incorporate air data systems that calculate air data outputs based on measured parameters collected from various sensors positioned about the aircraft. For instance, many air data systems utilize air data probes that measure pneumatic pressure of oncoming airflow about the aircraft exterior to generate aircraft air data outputs, such as angle of attack (i.e., an angle between the oncoming airflow or relative wind and a reference line of the aircraft, such as a chord of a wing of the aircraft), calibrated airspeed, Mach number, altitude, or other air data parameters. During sideslip of the aircraft (i.e., a nonzero angle between the direction of travel of the aircraft and the aircraft centerline extending through the nose of the aircraft), compensation of various local (to the probe) parameters or signals, such as angle of attack and static pressure, is advantageous for accurate determination of aircraft air data parameters, such as aircraft angle of attack or aircraft pressure altitude (determined from static pressure measurements).

Increased accuracy achieved through sideslip compensation is particularly relevant when the aircraft operates in RVSM space areas of air traffic control systems. RVSM compliance requires an aircraft to be equipped with two operational and independent altitude measurement systems and associated altitude-keeping equipment that cooperate to maintain the aircraft within certain altitude tolerance bands with respect to a selected altitude and weather conditions. To this end, many air data systems utilize multiple pneumatic air data probes positioned at opposite sides of the aircraft and cross-coupled to exchange pressure information. Static pressure sensed by an opposite side probe is used to compensate air data parameter outputs for a sideslip condition. In certain air data systems, cross-coupled probes are pneumatically connected so that the pressure signals are averaged between probes. Other air data systems utilize air data probes that are not pneumatically connected, but rather include processors and other electronic components for interchanging electrical signals representative of the pressure information (and other information) between probes. Such probes, having integrated electronics, are often referred to as electronic multi-function probes (MFPs). MFPs reduce the need for pneumatic couplings between the probes, thereby reducing space, cost, and maintenance associated with the pneumatic couplings.

However, existing air data systems installed on legacy aircraft are often not certified to operate in RVSM airspace and may not include air data system architectures that can compensate for sideslip or other aircraft conditions. Because the air data parameters provided to consuming systems of the legacy aircraft are uncompensated and pressure sensing probes associated with altitude measurement are susceptible to error as a result of the orientation of the aircraft within the airflow, adding RVSM compliance to these existing air data systems commonly requires significant redesign, RVSM certification, and associated schedule and cost. Since operators of legacy aircraft seek economical and robust solutions to certify legacy aircraft for RVSM airspace, a need exists to provide an autonomous air data system that supplements or replaces the altitude functions of the existing air data system.

SUMMARY

In one example, a method of augmenting an existing air data system of an aircraft includes sensing a first static pressure using a first electronics channel of a multi-function probe (MFP) in which the MFP is positioned to measure the static pressure of oncoming airflow about the aircraft exterior. The first electronics channel independently determines an altitude value based on the first static pressure sensed at the MFP and outputs the altitude value to the existing air data system that supplements or replaces an altitude value determined by the existing air data system.

In another example, a method of augmenting an existing air data system of an aircraft includes attaching a multi-function probe (MFP) to an exterior of the aircraft that is independent of the existing air data system. The MFP has a plurality of pressure sensing ports positioned to sense pressure of oncoming airflow about the aircraft exterior which includes at least first and second static pressure sensing ports operatively associated with a first electronics channel of the MFP. The method further includes electrically coupling the first electronics channel to the existing air data system for displaying altitude values based on the static pressure sensed at the first and second static pressure ports.

In another example, a system includes an existing air data system and a multi-function probe (MFP). The existing air data system includes an air data computer (ADC) electrically or pneumatically coupled to a pressure sensing probe in which the existing air data system can determine a first altitude value based on pressure sensed by the pressure sensing probe. The MFP includes a plurality of pressure sensing ports disposed in a portion of the MFP that extends into oncoming airflow about the aircraft exterior. A first electronics channel of the MFP can determine first and second altitude values independently of the existing air data system, each altitude value based on a static pressure sensed at one of a first static pressure port and a second static pressure port of the plurality of pressure sensing ports.

DETAILED DESCRIPTION

As described herein, an air data system architecture includes a multi-function probe (MFP) added to an existing air data system to provide RVSM compliant altitude functions. The MFP includes one or more static pressure ports to provide at least one independent altitude value based on static pressure sensed from the one or more static pressure ports. In some instances, the MFP includes at least two static pressure ports and provides at least two altitude values that are independent from each other and the existing air data system, each value based on static pressure sensed from one of the static pressure ports. Advantageous locations of the MFP on the aircraft combined with the installed orientation of the static pressure ports permit the altitude value to be compensated for sideslip, angle of attack, or both sideslip and angle of attack, thereby improving accuracy of the determined altitude value. Moreover, these improvements can be accomplished with a single MFP to reduce complexity, cost, and schedule associated with certifying a legacy aircraft for RVSM airspace. In each embodiment, the RVSM-compliant air data system is autonomous and independent from the existing air data system of the legacy aircraft.

Figure 1:
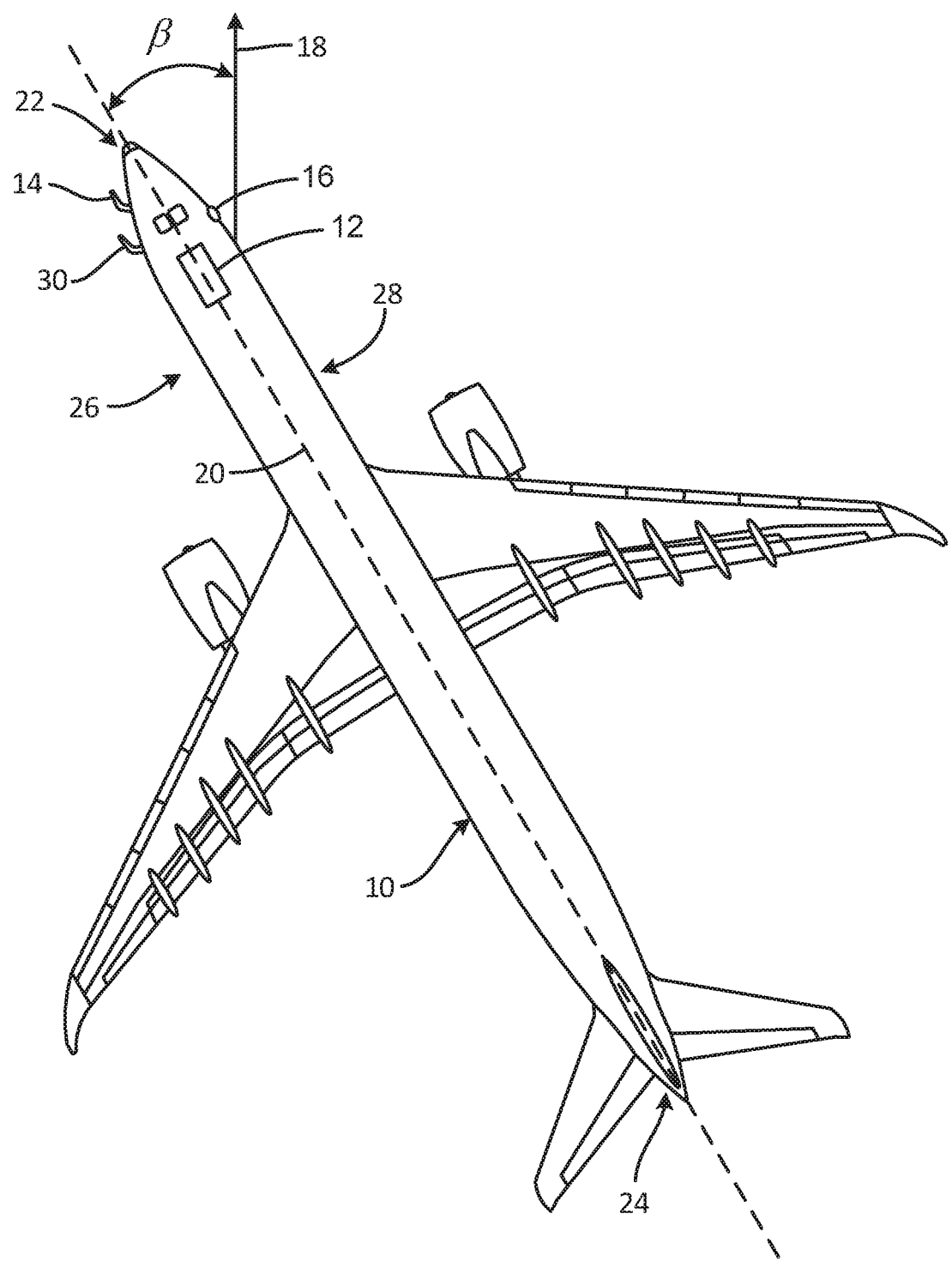
FIG. 1 is a top plan view and schematic representation of legacy aircraft 10 in a sideslip condition that includes existing air data system and a multi-function (MFP) probe.

FIG. 1 is a top plan view and schematic representation of legacy aircraft 10 in a sideslip condition that includes existing air data computer (ADC) 12. ADC 12 may be operatively associated with one or more pitot pressure probes 14 and flush-mounted static pressure probes 16 to form an existing air data system that is not RVSM certified. Aircraft 10 is illustrated in a sideslip condition where the path of travel of aircraft 10 is indicated at 18, and angle β between travel path 18 and central plane 20 is the angle of sideslip of aircraft 10. Central plane 20 extends from nose 22 to tail 24 and is orthogonal to a plane extending through the wings of aircraft 10. As illustrated, aircraft 10 includes first side 26 (or left side) and second side 28 (or right side) that is opposite first side 26 and separated by central plane 20.

Legacy aircraft 10 includes multi-function probe (MFP) 30 attached to an exterior of aircraft 10 and extending into oncoming airflow that is about the aircraft exterior. MFP 30 is shown attached to first side 26. However, MFP 30 can be located anywhere along the exterior of aircraft 10 in which the local airflow conditions during flight facilitate correlation between free stream airflow conditions adjacent to aircraft 10 and airflow pressure sensed by MFP 30. In some embodiments, MFP 30 is located along a top surface of aircraft 10 between first side 26 and second side 28 proximate to central plane 20. In other embodiments, MFP 30 is mounted to a bottom surface of aircraft 10 between first side 26 and second side 28 proximate to central plane 20. In still other embodiments, MFP 30 attaches to aircraft 10 at an azimuth along the aircraft exterior surface between one of the top surface and the bottom surface and either first side surface 26 or second side surface 28.

Notwithstanding its exterior mounting location, the pressure sensing ports of MFP 30 include an installed vertical direction and an installed lateral direction. The installed vertical direction extends orthogonal to a plane extending through the wings of aircraft 10 and parallel to central plane 20. The installed lateral direction extends parallel to the wings and orthogonal to central plane 20. As will be described in further detail below, static pressure ports are positioned along the exterior of MFP 30 in relation to the installed vertical and installed lateral directions to sense static pressure of airflow about aircraft 10 and are used to provide a set of air data parameters that is independent from air data parameters provided by the existing air data system. In particular, MFP 30 provides one or more altitude values based on static pressure measured at a static pressure port of MFP 30 and, in some instances, provides two altitude values, each value based on static pressure sensed at a different static pressure port of MFP 30.

Figure 2:
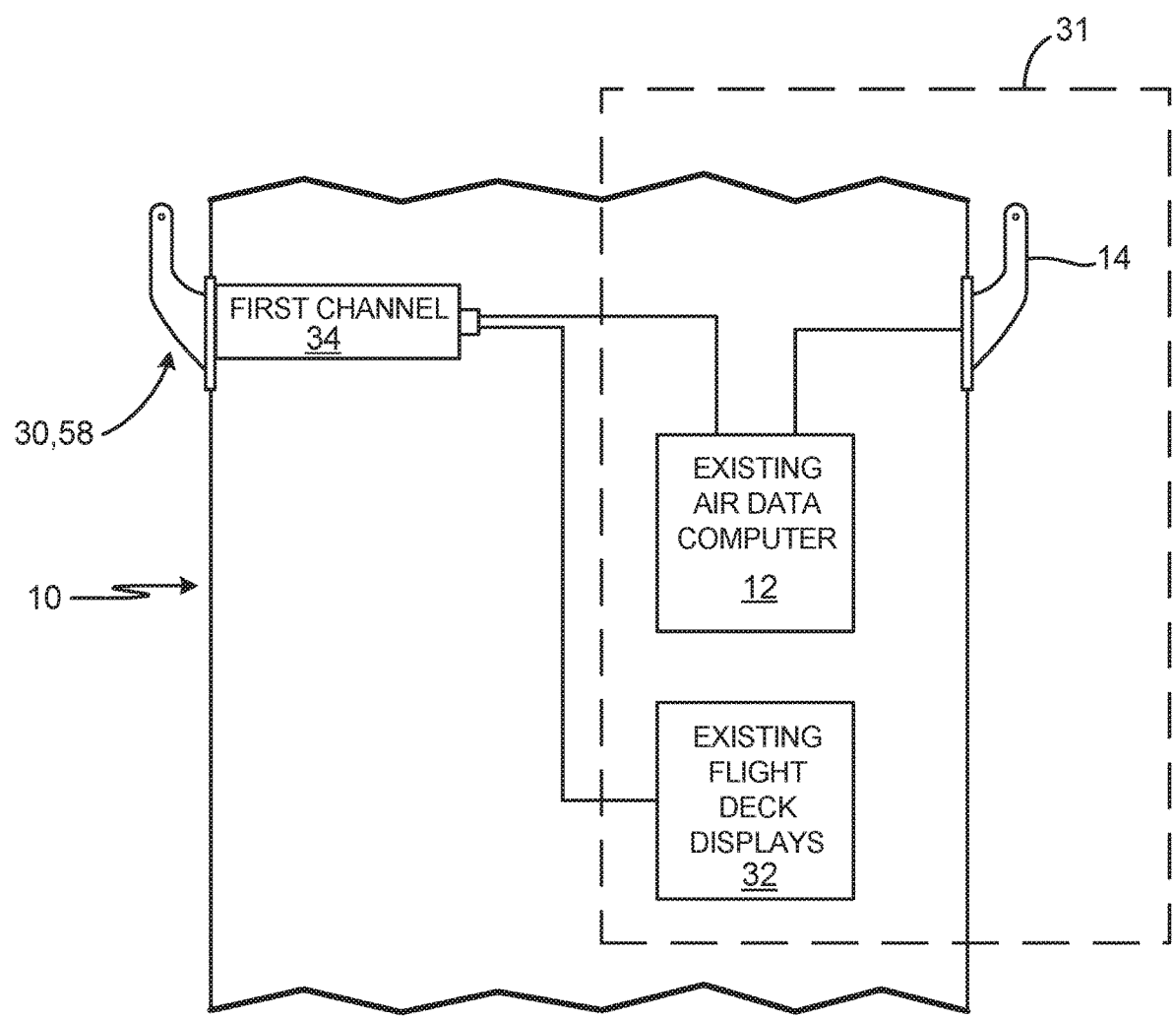
FIG. 2 is a schematic block diagram illustrating a first electronics channel of a MFP incorporated into the existing air data system for independently determining altitude values.

FIG. 2 is a schematic block diagram showing MFP 30 (or MFP 58 discussed below) incorporated into the existing air data system of aircraft 10 represented by dashed box 31, which includes ADC 12, pressure sensing probe 14, and flight deck displays 32. Although only one probe is illustrated, pressure sensing probe 14 can be one of many air data probes and/or sensors associated with existing air data system 31. In this instance, probe 14 measures pressure of oncoming airflow about the exterior of aircraft 10 and is electrically or pneumatically coupled to ADC 12 to produce air data parameters displayed on one or more flight deck displays 32. MFP 30 includes first electronics channel 34 that determines at least one altitude value independently of existing air data system 31.

Figure 3:
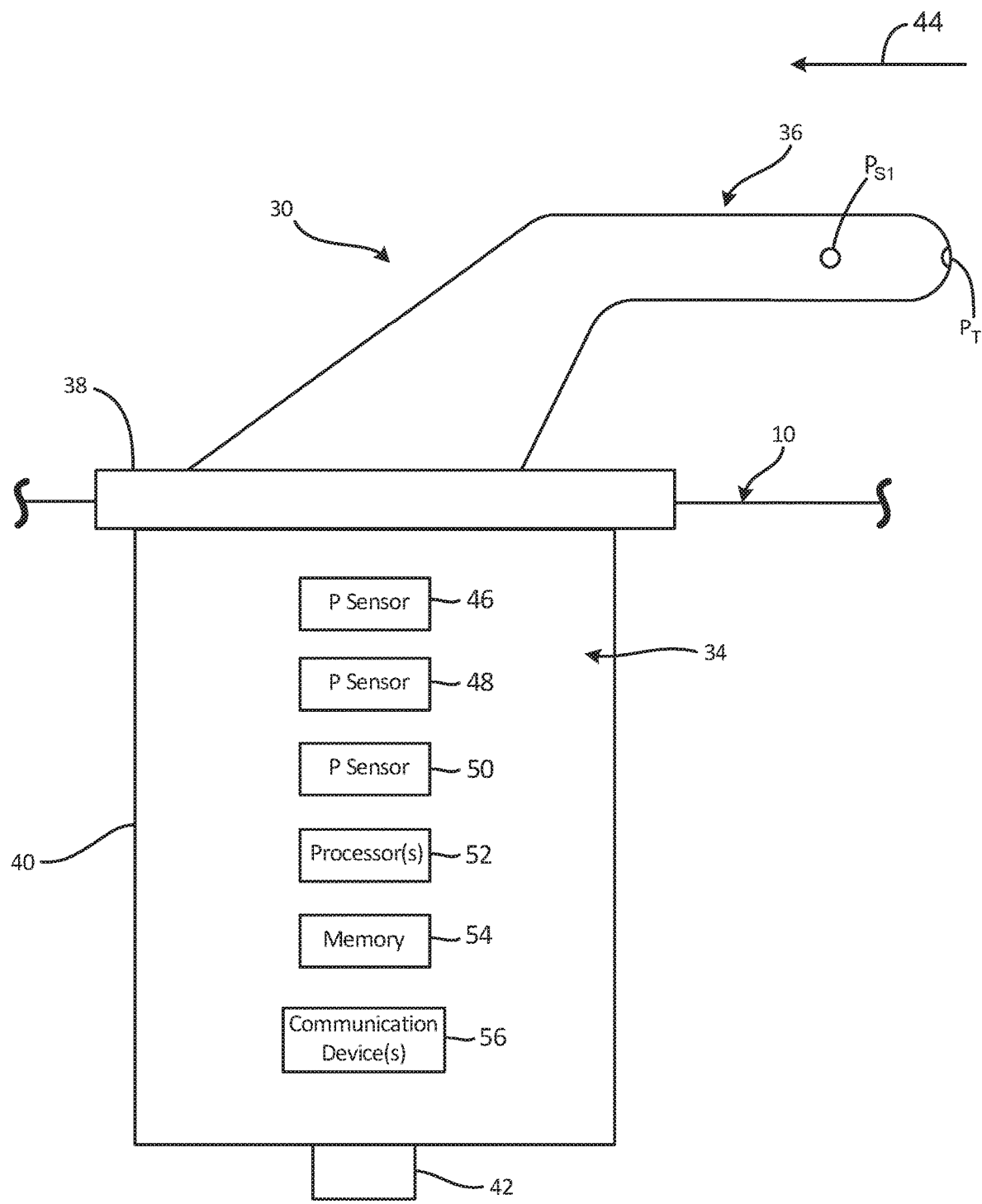
FIG. 3 is a schematic cross-sectional view of a MFP with one set of static pressure ports used for independently determining altitude values that supplement or replace the altitude value calculated by the existing air data system.

FIG. 3 is a schematic cross-sectional view of MFP 30 as implemented in the air data architecture depicted by FIG. 2. MFP 30 is an air data sensing probe including a portion extending into the oncoming airflow (e.g., barrel portion 36), mounting plate 38, electronics housing 40, and first electronics interface connector 42. Barrel portion 36 is configured to extend into oncoming airflow 44 (i.e., flowing right to left as depicted in FIG. 3) about the exterior of aircraft 10. The tip or nose of barrel portion 36 may have a hemispherical profile, such as the profile shown in FIGS. 3 and 4. In other embodiments, the tip of barrel portion 36 may have a conical profile. Electronics housing 40 encloses first electronics channel 34, which includes pressure sensors 46, 48, and 50, one or more processors 52, computer-readable memory 54, and one or more communication devices 56. Pressure sensors 46, 48, and 50 can be absolute pressure sensors or differential pressure sensors. Alternatively, one or more or pressure sensors 46, 48, and 50 can be absolute pressure sensors while one or more other pressure sensors 46, 48, and 50 can be differential pressure sensors.

Figure 4:
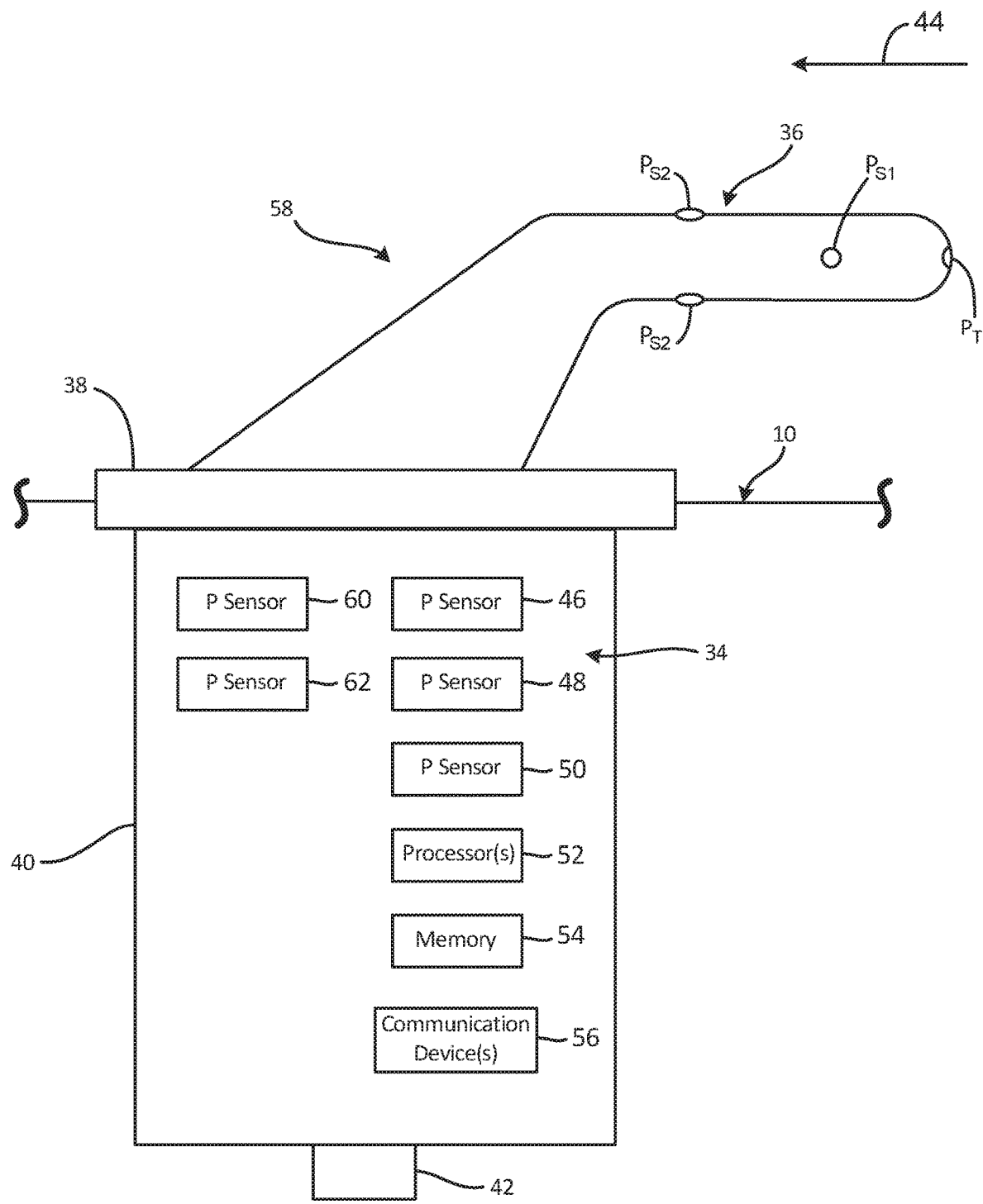
FIG. 4 is a schematic cross-sectional view of a MFP with multiple sets of static pressure ports used for independently determining altitude values that supplement or replace the altitude value calculated by the existing air data system.

A plurality of pressure sensing ports are disposed in barrel portion 36 and include at least a total pressure sensing port $P_T$ at the tip of barrel 36 and at least one static pressure sensing port $P_{S1}$ disposed aft of the barrel tip in the direction of airflow 44. In some embodiments, barrel 36 includes multiple (e.g., at least two) static pressure sensing ports $P_{S1}$. Static pressure sensing ports $P_{S1}$ may have any angular orientation about a longitudinal axis of barrel 36 and any axial spacing from the barrel tip suitable for measuring static pressure of the oncoming airflow. In some embodiments, static pressure sensing ports $P_{S1}$ may be spaced circumferentially only or axially spaced only. In other embodiments, static pressure sensing ports $P_{S1}$ may have a combination of axial and circumferential spacing about barrel 36. The particular arrangement of static pressure ports $P_{S1}$ is adapted to a particular aircraft and probe combination. As shown in FIG. 3 and FIG. 4 discussed below, a pressure sensing port $P_{S1}$ is disposed along a meridional plane of barrel 36. Though not illustrated, a second static pressure sensing port $P_{S1}$ is disposed in barrel portion 36 opposite static pressure sensing port $P_{S1}$. Moreover, for reasons discussed below, pressure sensing ports $P_{S1}$ are disposed on opposite sides of barrel 36, but in other embodiments, ports $P_{S1}$ may be on the same side of barrel 36 or be spaced circumferentially and/or axially.

Mounting plate 38 is configured to mount MFP 30 to aircraft 10 such that barrel portion 36 is disposed externally to aircraft 10 and extends into oncoming airflow about the exterior of aircraft 10. Electronics housing 40 extends axially from mounting plate 38 within the interior of aircraft 10. First electronics interface connector 42 extends axially from electronics housing 40 and is configured to mate with an electronics communications data bus or other electrical connection. Total pressure sensing port $P_T$ and static pressure sensing ports $P_{S1}$ are each pneumatically connected via a manifold or other pneumatic connection (not illustrated) to one of absolute pressure sensors 46, 48, and 50. Though pressure sensors 46, 48, and 50 are described herein as absolute pressure sensors, in some examples, any one or more of absolute pressure sensors 46, 48, and 50 can be implemented as a differential pressure sensor.

Processor 52 can include any one or more of a microprocessor, a controller, a digital signal processor (DSP), an application specific integrated circuit (ASIC), a field-programmable gate array (FPGA), or other equivalent discrete or integrated logic circuitry. Computer-readable memory 54 can be configured to store information within first electronics channel 34 during operation. Computer-readable memory, in some examples, is described as a computer-readable storage medium. In certain examples, a computer-readable storage medium can include a non-transitory medium. The term "non-transitory" can indicate that the storage medium is not embodied in a carrier wave or a propagated signal. In some examples, a non-transitory storage medium can store data that can, over time, change (e.g., in RAM or cache). Computer-readable memory can include volatile memory, non-volatile memory, or both. Examples of volatile memories can include random access memories (RAM), dynamic random access memories (DRAM), static random access memories (SRAM), and other forms of volatile memories. Examples of non-volatile memories can include flash memories, forms of electrically programmable memories (EPROM) or electrically erasable and programmable (EEPROM) memories, magnetic hard discs, optical discs, floppy discs, or other forms of non-volatile memories.

First electronics channel 34 utilizes communication device 56 to communicate with external devices via first electronics interface connector 42. For example, communication device 56 can be a network interface card (or other interface device) configured to send and receive data over a communications network and/or data bus according to one or more communications protocols, such as the ARINC 429 communication protocol, CAN bus communication protocol, MIL-STD-1553 communication protocol, or other communication protocol.

In operation, first electronics channel 34 utilizes pressure sensors 46 and 48 (measuring pressure corresponding to local static pressure) and pressure sensor 50 (measuring pressure corresponding to impact pressure) to sense pressure of the oncoming airflow about the exterior of aircraft 10 and generate local air data parameters including, e.g., local static pressure, local calculated airspeed, local Mach number, and local pressure altitude, as is known in the art.

In embodiments where the location of MFP 30 is on or near the top or bottom surface of aircraft 10, static pressure ports $P_{S1}$ can be positioned on barrel 36 to have an installed horizontal orientation (i.e., the openings of each port corresponds to one of the first side 26 and second side 28 of aircraft 10 as depicted in FIG. 1). In other words, static pressure port $P_{S1}$ (e.g., left-side static pressure port) and opposite side static pressure port $P_{S1}$ (e.g., right-side static pressure port) experience different flow conditions during sideslip. For instance, in the sideslip condition having sideslip angle β illustrated in FIG. 1, right-side static pressure port $P_{S1}$ experiences airflow having higher pressure conditions than those experienced by left-side static pressure port $P_{S1}$ due to the acceleration of the airflow about barrel 36 of MFP 30 prior to reaching left-side static pressure port $P_{S1}$. The difference between the two measured absolute pressures can be determined via, e.g., processor 52. Alternatively, a differential pressure sensor (not shown) can be used to measure differential pressure between right-side and left-side static pressure ports $P_{S1}$ directly. Accordingly, the angle of sideslip β can be determined based on the differential pressure between right-side and left-side static pressure ports $P_{S1}$ using a single multi-function probe, e.g., MFP 30. Once determined, first electronics channel 34 of MFP 30 can report angle of sideslip β as one of the air data parameters to existing air data system 31 (see FIG. 2) via first electronics interface connector 42. Moreover, the remaining air data parameters (e.g., pressure altitude) can be compensated based on the angle of sideslip β, resulting in increased accuracy of the reported parameters.

In other embodiments, MFP 30 can be installed on aircraft 10 such that static pressure ports $P_{S1}$ have an installed vertical orientation. With this orientation, static pressure port $P_{S1}$ faces towards the top side of aircraft 10 (i.e., a top-side port) while the opposite side static pressure port faces towards the bottom side of aircraft 10 (i.e., bottom-side port). For a downward angle of attack, bottom-side port $P_{S1}$ experiences airflow having higher pressure than top-side port $P_{S1}$ due to the acceleration of the oncoming airflow about barrel 36 of MFP 30. Likewise, for an upward angle of attack, the top-side port $P_{S1}$ experiences higher pressure airflow than bottom-side port $P_{S1}$. Again, the difference between the two measured absolute pressures can be determined via, e.g., processor 52, and used by first electronics channel 34 to determine an angle of attack. The determined angle of attack can then be used to compensate air data parameters reported to the existing air data system. In particular, pressure altitude can be compensated using the angle of attack, resulting in increased altitude accuracy.

FIG. 4 is a schematic cross-sectional view of MFP 58 which can be used in place of MFP 30 in the air data system architecture depicted by FIG. 2. MFP 58 is an air data sensing probe including barrel portion 36, mounting plate 38, electronics housing 40, first electronics interface connector 42. Like MFP 30, MFP 58 has a plurality of pressure sensing ports in barrel portion 36 that includes at least total pressure sensing port $P_T$ and static pressure sensing ports $P_{S1}$. These components are configured and operate in the same manner as described previously with respect to MFP 30. Accordingly, MFP 58 extends into the oncoming airflow to provide air data parameters independently of probes associated with existing air data system 31.

In addition to these components, MFP 58 also includes at least one static pressure sensing port $P_{S2}$ disposed aft of the barrel tip in the direction of airflow 44. Static pressure port $P_{S2}$ can be circumferentially spaced, axially spaced, or circumferentially and axially spaced from static pressure port $P_{S1}$. In some embodiments, MFP 58 includes at least two static pressure sensing ports $P_{S2}$ circumferentially spaced from at least two static pressure port $P_{S1}$ such that ports $P_{S2}$ are circumferentially between static pressure ports $P_{S1}$ and a second static pressure sensing port $P_{S2}$ is disposed in barrel portion 36 opposite the first static pressure sensing port $P_{S2}$. For instance, in some embodiments, static pressure ports $P_{S2}$ are circumferentially spaced approximately 90 degrees from ports $P_{S1}$. With this arrangement, static pressure ports $P_{S1}$ can be aligned with a first plane passing through a centerline of barrel portion 36 while static pressure ports $P_{S2}$ can be aligned with a second plane passing through the barrel portion centerline and orthogonal to the first plane. Furthermore, although FIG. 4 shows static pressure ports $P_{S2}$ disposed aft of static pressure ports $P_{S1}$ along barrel portion 36, ports $P_{S2}$ can be the same axial distance from the tip of barrel portion 36 as static pressure ports $P_{S1}$ or be disposed axially forward from ports $P_{S1}$ in lieu of the depicted arrangement.

Each of static pressure ports $P_{S2}$ are pneumatically connected to one of absolute pressure sensors 60 and 62 of first electronics channel 34 to measure a static pressure of the oncoming airflow about the exterior of aircraft 10. Because MFP 58 has at least two sets of static pressure ports $P_{S1}$ and $P_{S2}$, MFP 58 can be installed onto aircraft 10 such that one set of static pressure ports functions as left-side and right-side ports to determine angle of sideslip while the other set of static pressure ports functions as the top-side and bottom-side ports to determine angle of attack in addition to providing static pressure values for pressure altitude calculations. Differential pressure between left-side and right-side ports can be used to determine angle of sideslip, and differential pressure between top-side and bottom-side ports can be used to determine angle of attack. In this instance, differential pressure can be determined by subtracting absolute pressures sensed at corresponding ports or, as discussed before, can be determined by pneumatically connecting differential pressure sensors (not shown) between left-side and right-side ports and between top-side and bottom-side ports. Accordingly, MFP 58 can compensate air data parameters for angle of sideslip and angle of attack. As such, the accuracy of the pressure altitude value can be further increased and delivered to existing air data system 31.

The following are non-exclusive descriptions of possible embodiments of the present invention.

A method of augmenting an existing air data system of an aircraft according to an exemplary embodiment of this disclosure, among other possible things, includes sensing a first static pressure of an oncoming airflow about an exterior of the aircraft, calculating a first altitude value based on the sensed first static pressure, and outputting the first altitude value to the existing air data system that supplements or replaces an altitude of the existing air data system. Sensing the first static pressure includes using a first electronics channel of a multi-function probe (MFP) to sense static pressure at a first static pressure port of the MFP.

The method of the preceding paragraph can optionally include, additionally and/or alternatively, any one or more of the following steps, features, configurations and/or additional components:

A further embodiment of the foregoing method can further include sensing a second static pressure of the oncoming airflow at a second static pressure port using the first electronics channel of the MFP.

A further embodiment of any of the foregoing methods can further include calculating the first altitude value using the first electronics channel.

A further embodiment of any of the foregoing methods can further include calculating a second altitude value using the first electronics channel.

A further embodiment of any of the foregoing methods can further include calculating a second altitude value based on a sensed second static pressure that is independent of the first altitude value.

A further embodiment of any of the foregoing methods can further include outputting a second altitude value to the existing air data system that supplements or replaces the altitude calculation of the existing air data system.

A further embodiment of any of the foregoing methods, wherein at least one of a first altitude value and a second altitude value is determined independently of the existing air data system.

A further embodiment of any of the foregoing methods can further include a first electronics channel that is integrally attached to the MFP.

A further embodiment of any of the foregoing methods can further include displaying at least one of the first and second altitude values using a display of the existing air data system.

A further embodiment of any of the foregoing methods can further include displaying at least one of the first and second altitude values simultaneously with the altitude calculated by the existing air data system.

A further embodiment of any of the foregoing methods can further include compensating at least one of the first and second altitude values based on a sensed pressure.

A further embodiment of any of the foregoing methods can further include compensating at least one of the first and second altitude values based on a sensed differential pressure.

A further embodiment of any of the foregoing methods can further include compensating at least one of the first and second altitude values based on a sensed absolute pressure.

A further embodiment of any of the foregoing methods can further include compensating at least one of the first and second altitude values based on a determined angle of sideslip.

A further embodiment of any of the foregoing methods can further include compensating at least one of the first and second altitude values based on a determined angle of attack.

A further embodiment of any of the foregoing methods, wherein compensating at least one of the first and second altitude values can further include determining an angle of sideslip of the aircraft based on a differential static pressure sensed between the first and second static pressure ports.

A further embodiment of any of the foregoing methods, wherein compensating at least one of the first and second altitude values can further include determining an angle of attack of the aircraft based on a differential static pressure sensed between the first and second static pressure ports.

A further embodiment of any of the foregoing methods can further include sensing a third static pressure of the oncoming airflow about the exterior of the aircraft at a third static pressure port using the first electronics channel of the MFP.

A further embodiment of any of the foregoing methods can further include sensing a fourth static pressure of the oncoming airflow about the exterior of the aircraft at a fourth static pressure port using the first electronics channel of the MFP.

A further embodiment of any of the foregoing methods, wherein one or more of the first, second, third, and fourth static pressure ports can be disposed on a portion of the MFP extending into the oncoming airflow.

A further embodiment of any of the foregoing methods, wherein one or more of the first, second, third, and fourth static pressure ports are disposed on a barrel portion of the MFP extending into the oncoming airflow.

A further embodiment of any of the foregoing methods, wherein the first and second static pressure ports can be disposed on opposite sides of a barrel portion of the MFP extending into the oncoming airflow.

A further embodiment of any of the foregoing methods, wherein the third and fourth static pressure ports can be disposed on opposite sides of a barrel portion of the MFP extending into the oncoming airflow.

A further embodiment of any of the foregoing methods, wherein third and fourth static pressure ports can be spaced circumferentially between first and second static pressure ports on a barrel portion of the MFP extending into the oncoming airflow.

A further embodiment of any of the foregoing methods can further include sensing a first differential pressure between the first and second static pressure ports of the MFP and sensing a second differential pressure between the third and fourth static pressure ports of the MFP.

A further embodiment of any of the foregoing methods can further include determining an angle of sideslip based on one of a first differential pressure and a second differential pressure and determining an angle of attack based on the other of the first differential pressure and the second differential pressure.

A further embodiment of any of the foregoing methods can further include compensating at least one of the first and second altitude values based on a determined angle of sideslip and a determined angle of attack.

A method of augmenting an existing air data system of an aircraft in accordance with another exemplary embodiment, among other possible things includes attaching a multi-function probe (MFP) having a plurality of pressure sensing ports to an exterior of the aircraft that is independent of the existing air data system of the aircraft and electrically coupling a first electronics channel of the MFP to the existing air data system for displaying a first altitude value and a second altitude value. The first altitude value and the second altitude value are based on static pressure on the oncoming airflow about an exterior of the aircraft sensed at first and second static pressure ports, respectively, of the plurality of pressure sensing ports, each static pressure port disposed along a barrel portion of the MFP.

The method of the preceding paragraph can optionally include, additionally and/or alternatively, any one or more of the following steps, features, configurations and/or additional components:

A further embodiment of the foregoing method, wherein attaching the MFP to the aircraft exterior can include locating the MFP on the aircraft exterior such that the first static pressure port and the second static pressure port have an installed horizontal orientation.

A further embodiment of any of the foregoing methods, wherein attaching the MFP to the aircraft exterior can include locating the MFP on one of a top side and a bottom side of the aircraft.

A further embodiment of any of the foregoing methods, wherein attaching the MFP to the aircraft exterior can include locating the MFP on a side of the aircraft such that the first static pressure port and the second static pressure port have an installed vertical orientation.

A further embodiment of any of the foregoing methods, wherein attaching the MFP to the aircraft exterior can include locating the MFP on the aircraft exterior such that the first static pressure port and the second static pressure port have an installed location able to detect angle of sideslip.

A further embodiment of any of the foregoing methods, wherein attaching the MFP to the aircraft exterior can include locating the MFP on the aircraft exterior such that the first static pressure port and the second static pressure port have an installed location able to detect angle of attack.

A system in accordance with another exemplary embodiment of the present disclosure, among other possible things can includes an existing air data system for an aircraft and a multi-function probe (MFP) attached to the exterior of the aircraft. The existing air data system includes an air data computer (ADC) electrically or pneumatically coupled to a pressure sensing probe and is configured to determine a first altitude value based on a first pressure of an oncoming airflow about an exterior of the aircraft sensed at the pressure sensing probe. The MFP includes a barrel portion with a plurality of pressure sensing ports extending into the oncoming airflow, the plurality of pressure sensing ports including at least a first static pressure sensing port and a second static pressure sensing port disposed on an opposite side of the barrel with respect to the first static pressure sensing port. A first electronics channel of the MFP is configured to determine a second altitude value and a third altitude value independent of the existing air data system, each the second and third altitude values based on static pressure sensed at the first and second static pressure sensing ports, respectively.

The system of the preceding paragraph can optionally include, additionally and/or alternatively, any one or more of the following features, configurations and/or additional components:

A further embodiment of the foregoing system, wherein the first electronics channel can include a differential pressure sensor communicating with the first and second static pressure ports.

A further embodiment of any of the foregoing systems, wherein the first electronics channel can be configured to determine one of an angle of sideslip and an angle of attack based on a differential pressure sensed by a differential pressure sensor.

A further embodiment of any of the foregoing systems, wherein the first electronics channel can be configured to compensate the first and second altitude values base on an angle of sideslip, an angle of attack, or an angle of sideslip and an angle of attack determined by the first electronics channel.

A further embodiment of any of the foregoing systems, wherein the plurality of pressure sensing ports can include a third static pressure sensing port and a fourth pressure sensing port in the barrel of the MFP.

A further embodiment of any of the foregoing systems, wherein third and fourth pressure sensing ports are spaced circumferentially between first and second static pressure sensing ports.

A further embodiment of any of the foregoing systems, wherein the first electronics channel can include a first differential pressure sensor communicating with the first and second static pressure ports and a second differential pressure sensor communicating with the third and fourth static pressure sensing ports.

A further embodiment of any of the foregoing systems, wherein the first electronics channel can be configured to determine an angle of sideslip based on a first differential pressure sensed by the first differential pressure sensor and to determine an angle of attack based on a second differential pressure sensed by the second differential pressure sensor.

A further embodiment of any of the foregoing systems, wherein the first electronics channel can be configured to compensate the first and second altitude values based on the determined angle of sideslip and angle of attack.

A further embodiment of any of the foregoing systems, wherein the MFP can be attached to a top side of the aircraft.

A further embodiment of any of the foregoing systems, wherein first and second pressure sensing ports have an installed horizontal orientation relative to the aircraft.

A further embodiment of any of the foregoing systems, wherein first and second pressure sensing ports have an installed vertical orientation relative to the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of augmenting an existing air data system of an aircraft, the method comprising:
    attaching a multi-function probe (MFP) to an exterior of the aircraft that is independent of the existing air data system of the aircraft, wherein the existing data system lacks one or more of at least two altitude values determined independently and multiple altitude values compensated for sideslip and/or angle of attack, and wherein the probe comprises a plurality of pressure sensing ports positioned to sense pressure of an oncoming airflow about an aircraft exterior, and wherein the plurality of pressure sensing ports includes a first static pressure port and a second static pressure port operatively associated with a first electronics channel; and
    electrically coupling the first electronics channel to the existing air data system for displaying a first altitude value based on a first static pressure of an oncoming airflow about the aircraft exterior measured at the first static pressure port and displaying a second altitude value based on a second static pressure of the oncoming airflow measured at the second static pressure port.

2. The method of claim 1, wherein attaching the MFP to the aircraft exterior includes:
    locating the MFP on the aircraft exterior such that the first static pressure port and the second static pressure port have an installed location able to detect angle of sideslip.

3. The method of claim 1, wherein attaching the MFP to the aircraft exterior includes:
    locating the MFP on a side of the aircraft such that the first static pressure port and the second static pressure port have an installed location able to detect angle of attack.

4. A system comprising:
    an existing air data system for an aircraft, the existing air data system comprising:
        a pressure sensing probe having a pressure sensing port; and
        an air data computer (ADC) electrically or pneumatically coupled to the pressure sensing probe, wherein the ADC is configured to determine a first altitude value based on a first pressure of an oncoming airflow about an exterior of the aircraft sensed at the pressure sensing port;
        wherein the existing data system lacks one or more of at least two altitude values determined independently and multiple altitude values compensated for sideslip and/or angle of attack;
    a multi-function probe (MFP) attached to the exterior of the aircraft, the MFP comprising:
        a barrel portion extending into the oncoming airflow;
        a plurality of pressure sensing ports in the barrel portion that includes at least a first static pressure port and a second static pressure port disposed on the barrel portion; and
        a first electronics channel configured to determine a second altitude value based on the sensed first static pressure and a third altitude value based on the sensed second static pressure, wherein the second and third altitude values are determined independently of the existing air data system.

5. The system of claim 4, wherein the first static pressure port is disposed on an opposite side of the barrel portion relative to the second static pressure port.

6. The system of claim 5, wherein:
    the first electronics channel includes a differential pressure sensor communicating with the first and second static pressure ports;
    the first electronics channel is configured to determine one of an angle of sideslip and an angle of attack based on a differential pressure sensed by the differential pressure sensor; and
    the first electronics channel is configured to compensate the first and second altitude values based on the determined angle of sideslip or angle of attack.

7. The system of claim 5, wherein:
    the plurality of pressure sensing ports includes a third static pressure sensing port and a fourth static pressure sensing port in the barrel of the MFP, and
    each of the third and fourth pressure sensing ports are spaced circumferentially between the first and second static pressure sensing ports.

8. The system of claim 7, wherein:
    the first electronics channel includes a first differential pressure sensor communicating with the first and second static pressure ports and a second differential pressure sensor communicating with the third and fourth static pressure sensing ports;
    the first electronics channel is configured to determine an angle of sideslip based on a first differential pressure sensed by the first differential pressure sensor and to determine an angle of attack based on a second differential pressure sensed by the second differential pressure sensor; and
    the first electronics channel is configured to compensate the first and second altitude values based on the determined angle of sideslip and angle of attack.

* * * * *